US008221537B2

(12) United States Patent
Fechner et al.

(10) Patent No.: US 8,221,537 B2
(45) Date of Patent: Jul. 17, 2012

(54) WATER-BASED PIGMENT PREPARATIONS

(75) Inventors: Bjoern Fechner, Eppstein (DE); Carsten Schaefer, Muehldorf am Inn (DE); Alexander Woerndle, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 126 days.

(21) Appl. No.: 12/451,401

(22) PCT Filed: Apr. 29, 2008

(86) PCT No.: PCT/EP2008/003454
§ 371 (c)(1),
(2), (4) Date: Nov. 9, 2009

(87) PCT Pub. No.: WO2008/138484
PCT Pub. Date: Nov. 20, 2008

(65) Prior Publication Data
US 2011/0244385 A1 Oct. 6, 2011

(30) Foreign Application Priority Data
May 10, 2007 (DE) .......................... 10 2007 021 867

(51) Int. Cl.
C09B 67/00 (2006.01)
C09B 67/20 (2006.01)
C09D 17/00 (2006.01)
B01F 17/00 (2006.01)

(52) U.S. Cl. .................. 106/493; 106/15.05; 106/31.58; 106/31.6; 106/31.75; 106/34; 106/272; 106/413; 106/494; 106/495; 106/496; 106/497; 106/498; 106/499; 430/7; 430/108.1; 524/81

(58) Field of Classification Search .................. 106/413, 106/476, 493, 494, 495, 496, 497, 498, 499, 106/15.05, 31.58, 31.6, 31.75, 34, 272; 430/7, 430/108.1; 524/81
See application file for complete search history.

(56) References Cited

U.S. PATENT DOCUMENTS

| 4,156,616 | A |   | 5/1979  | Dietz et al. |
| 4,293,475 | A | * | 10/1981 | Sidi .............................. 523/410 |
| 5,484,851 | A |   | 1/1996  | Fock |
| 6,582,510 | B1 | * | 6/2003 | Schwartz ...................... 106/499 |
| 7,834,098 | B2 |  | 11/2010 | Wenning et al. |
| 7,905,955 | B2 |  | 3/2011  | Fechner et al. |
| 7,938,900 | B2 |  | 5/2011  | Fechner et al. |
| 2002/0019459 | A1 | * | 2/2002 | Albrecht et al. .............. 523/161 |
| 2003/0144399 | A1 | * | 7/2003 | Matta et al. ................... 524/419 |
| 2006/0247347 | A1 |  | 11/2006 | Glos et al. |
| 2008/0255316 | A1 |  | 10/2008 | Wenning et al. |
| 2009/0007820 | A1 | * | 1/2009 | Itoh et al. ...................... 106/400 |
| 2009/0221739 | A1 | * | 9/2009 | Knischka et al. .............. 524/505 |
| 2010/0137536 | A1 |  | 6/2010  | Fechner et al. |
| 2010/0137537 | A1 |  | 6/2010  | Fechner et al. |
| 2011/0065879 | A1 |  | 3/2011  | Fechner et al. |
| 2011/0107803 | A1 |  | 5/2011  | Fechner et al. |
| 2011/0185781 | A1 |  | 8/2011  | Fechner et al. |
| 2011/0213094 | A1 |  | 9/2011  | Fechner et al. |

FOREIGN PATENT DOCUMENTS

| DE | 2638946 | 3/1978 |
| DE | 102005012315 | 9/2006 |
| EP | 0458245 | 11/1991 |
| EP | 0567214 | 10/1993 |
| EP | 1293523 | 3/2003 |
| EP | 1721941 | 11/2006 |
| WO | WO 02/51948 | 4/2002 |

OTHER PUBLICATIONS

PCT International Search Report for PCT/EP 2008/003454, Apr. 9, 2008.
Chemical Abstract Services, Columbus OH US "Aqueous Pigment Dispersions and Water-thinned inks for ink-jet recording with Excellent Gloss" XP 002492659; Mar. 22, 2007.
English Translation of the PCT International Report on Patentability for PCT/EP 2008/003454, Nov. 12, 2009.

* cited by examiner

Primary Examiner — Anthony J Green
(74) Attorney, Agent, or Firm — Anthony A. Bisulca

(57) ABSTRACT

The invention relates to aqueous pigment preparations containing (A) at least one organic and/or inorganic pigment, (B) a dispersant of formula (I) or (II), or mixtures of the dispersants of formula (I) and (II), (C) optionally wetting agents, (D) optionally other surfactants and/or dispersants, (E) optionally one or more organic solvents or one or more hydrotropic substances, (F) optionally other additives used conventionally for the production of aqueous pigment dispersions and (G) water.

12 Claims, No Drawings

WATER-BASED PIGMENT PREPARATIONS

The present invention provides aqueous pigment preparations comprising novel anionic polymers as dispersants and also their use for coloration of natural and synthetic materials.

Dispersing pigments in liquid media typically requires dispersants. Dispersants can be of anionic, cationic, amphoteric or neutral structure. They can be of low molecular weight, or represent high molecular weight polymers which constitute a random, alternating, blocklike, comblike or star-shaped architecture of the polymerized monomers.

Examples of where dispersants are of particular commercial importance are the dispersing of pigments in the manufacture of pigment concentrates (used for coloration of emulsion and varnish colors, paints, coatings and printing inks) and also the coloration of paper and paper pulp, cardboard, textiles and surfaces thereof.

Pigment preparations comprising ordered polymeric structures are also described in the prior art. Examples thereof are EP 1 293 523, DE 10 2005 012 315 and EP 1 721 941.

However, the nonionic novolak dispersants used in the past have hitherto not been successfully replaced in terms of performance without disadvantages having to be accepted in turn. The formerly customary novolak dispersants contain as a consequence of their process of production residues of alkylphenols, frequently nonylphenol, and ethoxylates thereof. Since alkylphenol ethoxylates, or their degradation products, scarcely undergo any degradation in the environment, they build up. This is problematic in that they have a hormonal effect on aquatic organisms. Therefore, many countries have adopted legislation (2003/53/EC for example) which limits or bans the use of materials containing alkylphenols or their ethoxylates in open-loop systems.

Studies to date have shown that it is still extremely difficult to synthesize dispersants that are equivalent to nonionic novolak systems. There is accordingly a need for novel dispersants that are capable of dispersing organic pigments in high concentration above 40% to low-viscosity dispersions. These dispersions shall be straightforward to produce; i.e., the pigments shall be readily wetted and be readily incorporated into the aqueous medium. The dispersion shall have a high and reproducible color strength that remains stable for a period of several years. Similarly, all further coloristic parameters such as, for example, hue angle and chroma shall be reproducible and stable. The dispersion should not foam or cause or speed foaming in the application medium. Furthermore, the dispersants should contribute to broad compatibility of the dispersions in various application media. Moreover, the dispersion shall be shear stable; i.e., its color strength or coloristics must not change significantly under shearing.

It has now been found that, surprisingly, specific anionic copolymers, prepared by means of macromonomers composed of polyethylene/polypropylene glycol mono(meth)acrylic esters, achieve the stated object and equal nonionic novolak systems in their performance as dispersants.

The present invention provides aqueous pigment preparations comprising (A) at least one organic and/or inorganic pigment, (B) a dispersant of formula (I) or (II) or mixtures of dispersants of formulae (I) and (II),

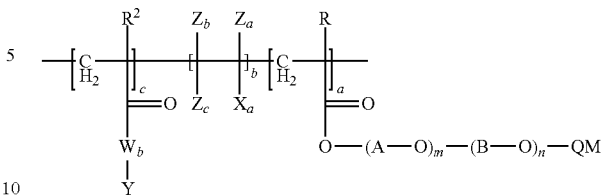

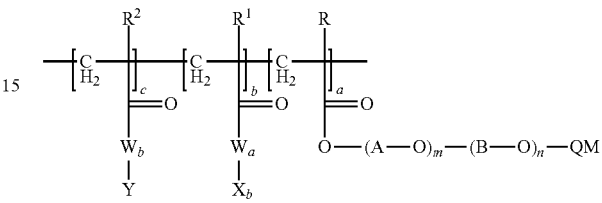

where the indices a, b and c indicate the molar fraction of the respective monomers $a=0.01-0.8$ $b=0.001-0.8$ $c=0.001-0.8$ provided the sum total of a+b+c is 1, and more preferably $a=0.1-0.7$ $b=0.1-0.6$ $c=0.1-0.6$ provided the sum total of a+b+c is 1, A represents $C_2$-$C_4$-alkylene, B represents a $C_2$-$C_4$-alkylene other than A, R represents hydrogen or methyl, m is from 1 to 500, preferably from 1 to 50;

n is from 1 to 500, preferably from 1 to 50;

provided the sum total of m+n is from 2 to 1000;

$X_a$ represents an aromatic or araliphatic radical having 3 to 30 carbon atoms which optionally contains one or more of the hetero atoms N, O and S, $Z_a$ represents H or $(C_1$-$C_4)$-alkyl, $Z_b$ represents H or $(C_1$-$C_4)$-alkyl, $Z_c$ represents H or $(C_1$-$C_4)$-alkyl;

$R^1$ represents hydrogen or methyl, $X_b$ represents an aromatic or araliphatic radical having 3 to 30 carbon atoms which optionally contains one or more of the hetero atoms N, O and S, $W_a$ represents oxygen or an NH group, $R^2$ represents hydrogen or methyl, Y represents an aliphatic hydrocarbyl radical having 1 to 30 carbon atoms, preferably 6 to 30, particularly 9 to 20 carbon atoms, which may be linear or branched or else cyclic, and which may contain hetero atoms O, N and/or S and may also be unsaturated, $W_b$ represents oxygen or an NH group;

Q represents $SO_3$, $CH_2COO$, $PO_3M$;

or QM represents:

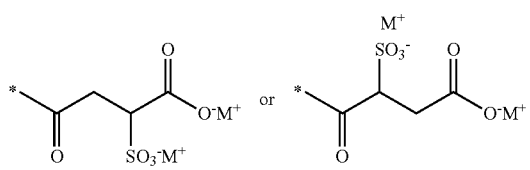

where

M represents H, a monovalent metal cation, a divalent metal cation, $NH_4^+$, a secondary, tertiary or quaternary ammonium ion, or a combination thereof, or represents equivalents of di-, tri- or polyvalent metal ions such as for example $Ca^{2+}$ or $Al^{3+}$ (the asterisk * in the Markush formula indicates that there is a link to the polymer at this site);

(C) optionally wetters,
(D) optionally further surfactants and/or dispersants,
(E) optionally one or more organic solvents and/or one or more hydrotropic substances,
(F) optionally further additive materials customary for preparing aqueous pigment dispersions, and
(G) water.

Preferred pigment preparations comprise 5% to 80% by weight, for example 10% to 70% by weight, of component (A).

Preferred pigments preparations comprise 0.1% to 30% by weight, for example 2% to 15% by weight of component (B).

Particularly preferred pigment preparations comprise in terms of component
(A) 5% to 80% by weight, for example 10% to 70% by weight,
(B) 0.1% to 30% by weight, for example 2% to 15% by weight,
(C) 0% to 10% by weight, for example 0.1% to 5% by weight,
(D) 0% to 20% by weight, for example 1% to 10% by weight,
(E) 0% to 30% by weight, for example 5% to 20% by weight,
(F) 0% to 20% by weight, for example 0.1% to 5% by weight,
(G) balance water,
all based on the total weight (100% by weight) of the pigment preparation.

When one or more of components (C), (D), (E) and (F) are present, their minimum concentrations independently of each other are preferably at least 0.01% by weight and more preferably at least 0.1% by weight, based on the total weight of the pigment preparation.

Component (A) in the pigment preparation of the present invention is a finely divided organic or inorganic pigment or a mixture of various organic and/or inorganic pigments. Component (A) can also be a dye that is soluble in certain solvents and has pigment character in other solvents. The pigments can be used not only in the form of dry powder but also as water-moist presscake.

Useful organic pigments include monoazo, disazo, laked azo, β-naphthol, Naphthol AS, benzimidazolone, disazo condensation, azo metal complex pigments or polycyclic pigments such as, for example, the phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments or carbon blacks.

Of the organic pigments mentioned, those which are in a very fine state of subdivision for producing the preparations are particularly suitable, and preferably 95% and more preferably 99% of the pigment particles have a particle size ≦500 nm.

An exemplary selection of particularly preferred organic pigments includes carbon black pigments, for example lamp or furnace blacks; monoazo and disazo pigments, in particular the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Yellow 219, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; 13-naphthol and Naphthol AS pigments, in particular the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 256, Pigment Orange 5, Pigment Orange 38 or Pigment Brown 1; laked azo and metal complex pigments, in particular the Colour Index pigments Pigment Red 48:2, Pigment Red 48:3, Pigment Red 48:4, Pigment Red 57:1, Pigment Red 257, Pigment Orange 68 or Pigment Orange 70; benzimidazoline pigments, in particular the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, in particular the Colour Index pigments Pigment Yellow 139 or Pigment Yellow 173; phthalocyanine pigments, in particular the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7 or Pigment Green 36; anthanthrone, anthraquinone, quinacridone, dioxazine, indanthrone, perylene, perinone and thioindigo pigments, in particular the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23 or Pigment Orange 43; triarylcarbonium pigments, in particular the Colour Index pigments Pigment Red 169, Pigment Blue 56 or Pigment Blue 61; diketopyrrolopyrrole pigments, in particular the Colour Index pigments Pigment Red 254, Pigment Red 255, Pigment Red 264, Pigment Red 270, Pigment Red 272, Pigment Orange 71, Pigment Orange 73, Pigment Orange 81.

Laked dyes such as calcium, magnesium and aluminum lakes of sulfonated and/or carboxylated dyes are also suitable.

Suitable inorganic pigments include for example titanium dioxides, zinc sulfides, zinc oxides, iron oxides, magnetites, manganese iron oxides, chromium oxides, ultramarine, nickel or chromium antimony titanium oxides, manganese titanium rutiles, cobalt oxides, mixed oxides of cobalt and of aluminum, rutile mixed phase pigments, sulfides of the rare earths, spinels of cobalt with nickel and zinc, spinels based on iron and chromium with copper zinc and also manganese, bismuth vanadates and also blend pigments. The Colour Index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33 and also Pigment White 6 are used in particular. Preference is frequently also given to using mixtures of inorganic pigments. Mixtures of organic with inorganic pigments are likewise often used.

Instead of pigment dispersions it is also possible to prepare dispersions of solids including for example natural finely divided ores, minerals, sparingly soluble or insoluble salts, particles of wax or plastic, dyes, crop protection and pest control agents, UV absorbers, optical brighteners and polymerization stabilizers.

Component (B) comprises novel specific nonionic copolymers being used as dispersants. These copolymers have a molecular weight of $10^3$ g/mol to $10^9$ g/mol, more preferably of $10^3$ to $10^7$ g/mol and even more preferably $10^3$ to $10^5$ g/mol.

These polymers are prepared by free-radical polymerization of monomers corresponding to the radicals in formula (I) or (II) which are described in the parentheses [ ]$_c$, [ ]$_b$ and [ ]$_a$. Following polymerization, the nonionic polymer thus obtained is converted to anionic functionalities. Anionic functionalities are for example $SO_3M$, $CH_2COOM$, $PO_3M_2$ or sulfosuccinate.

The method of preparation is described in German patent application DE 10 2007 021 869.

In one preferred embodiment of component (B), $(A-O)_m$ represents propylene oxide units and $(B-O)_n$ represents ethylene oxide units, or $(A-O)_m$ represents ethylene oxide units and $(B-O)_n$ represents propylene oxide units, and the molar fraction of ethylene oxide units is in the range from preferably 50 to 98%, more preferably 60 to 95%, even more preferably 70 to 95%, based on the sum total of ethylene oxide and propylene oxide units.

The sum total of the alkylene oxide units can in principle be n+m=2 to 1000, although 2 to 500 is preferred, 2 to 100 is particularly preferred and 5 to 100 is even more particularly preferred.

It is an essential property of the polymers according to the present invention that their polyalkylene glycol side chains are not purely polyethylene glycols or polypropylene glycols. Rather, the polyalkylene glycols are either random or block-like polyalkylene glycols composed of propylene oxide and ethylene oxide units. It is only the fine-tuning of this EO/PO ratio that provides polymeric dispersants useful for preparing highly concentrated pigment dispersions of low viscosity. The optimized ratios for the EO/PO fraction in the monomer [ ]$_a$ in combination with the aromatic and aliphatic monomers [ ]$_b$ and [ ]$_b$ makes it possible to emulate the properties of novolak-type dispersants such that a very similar performance profile is obtained.

The monomers of group [ ]$_b$ of component (B) include for example the following esters and amides of acrylic acid and methacrylic acid: phenyl, benzyl, tolyl, 2-phenoxyethyl, phenethyl. Possible monomers further include vinylaromatic monomers such as styrene and its derivatives, such as vinyltoluene and α-methylstyrene for example. The aromatic unit may also comprise heteroaromatics, as in 1-vinylimidazole for example.

Particularly preferred monomers of group [ ]$_b$ can be: styrene, 1-vinylimidazole, benzyl methacrylate, 2-phenoxyethyl methacrylate and phenethyl methacrylate.

The monomers of group [ ]$_b$ of component (B) include for example the following esters and amides of acrylic acid and methacrylic acid: methyl, ethyl, propyl, isopropyl, n-butyl, isobutyl, t-butyl, pentyl, hexyl, 2-ethylhexyl, 3,3-dimethylbutyl, heptyl, octyl, isooctyl, nonyl, lauryl, cetyl, stearyl, behenyl, cyclohexyl, trimethylcyclohexyl, t-butylcyclohexyl, bornyl, isobornyl, adamantyl, (2,2-dimethyl-1-methyl)propyl, cyclopentyl, 4-ethyl-cyclohexyl, 2-ethoxyethyl, tetrahydrofurfuryl and tetrahydropyranyl.

Preferred monomers of group [ ]$_b$ of component (B) are the following alkyl esters and alkylamides of acrylic acid and methacrylic acid: methyl, ethyl, propyl, butyl, isobutyl, 2-ethoxyethyl, myristyl, octadecyl, more preferably 2-ethylhexyl and lauryl.

In the case of the sulfosuccinates of component (B), the nonionic copolymers are for example initially esterified with maleic anhydride. Subsequently, the maleic monoester obtained is sulfonated. To this end, it is reacted for example with sodium sulfite or sodium pyrosulfite in an aqueous solution.

The sulfate esters of component (B) are prepared for example by reacting the nonionic copolymers with sulfamic acid.

The terminal hydroxyl functions can be converted into the corresponding polyether carboxylates, component (B), by carboxymethylation, for example with sodium chloroacetate.

The phosphoric esters of component (B) are obtainable for example by reacting a melt of the nonionic copolymer with polyphosphoric acid or phosphorus pentoxide. This reaction may yield not only phosphoric monoesters but also phosphoric diesters and triesters.

Component (C) comprises for example cationic, anionic, amphoteric or nonionic compounds which enhance pigment wetting (wetting agents, wetters).

Component (D) in the pigment preparations of the present invention comprises customary dispersants and surfactants useful for preparing aqueous pigment dispersions, or mixtures thereof. Anionic, cationic, amphoteric or nonionic surface-active compounds are typically used for this purpose. Among these are dispersants having one or more medium-length or long hydrocarbyl chains, in some instances also those having aromatic ring groups, that will be found particularly useful. Of the multiplicity of compounds only a selection will be recited here, without the utility of compounds according to the present invention being limited to these examples. Examples are alkyl sulfates such as, for example lauryl sulfate, stearyl sulfate or octadecyl sulfate, primary alkyl sulfonates such as, for example, dodecyl sulfonate, and secondary alkyl sulfonates, particularly the $C_{13}$-$C_{17}$ alkanesulfonate sodium salt, alkyl phosphates, alkylbenzenesulfonates such as, for example, dodecylbenzenesulfonic acid, similarly all salts thereof. Also useful are soy lecithin and condensation products of fatty acid and taurine or hydroxyethanesulfonic acid, similarly alkoxylation products of alkylphenols, castor oil rosin esters, fatty alcohols, fatty amines, fatty acids and fatty acid amides, which alkoxylation products can similarly be equipped with ionic end groups, for example in the form of sulfosuccinic monoesters or else as sulfonic, sulfuric and phosphoric esters, and also salts thereof, the sulfonates, sulfates or phosphates. Alkoxylated addition compounds obtained by reaction of polyepoxides with amines or bisphenol-A or bisphenol-A derivatives with amines are also suitable, as are similarly urea derivatives.

Similarly suitable are nonionic alkoxylated styrene-phenol condensates obtained by addition of optionally substituted styrenes onto optionally substituted phenols and reaction with ethylene oxide and/or propylene oxide, similarly ionically modified derivatives thereof, for example as sulfonic, sulfuric and phosphoric esters, and also salts thereof, the sulfonates, sulfates or phosphates. Useful surface-active compounds further include lignosulfonates and polycondensates of naphthalenesulfonic acid and formaldehyde, or else of alkylarylsulfonic acids, haloarylsulfonic acid, sulfonated phenols or sulfonated naphthols with formaldehyde.

Component (E) comprises organic solvents or water-soluble hydrotropic substances. Hydrotropic compounds, which also serve as a solvent, if appropriate, or are oligomeric or polymeric in nature are for example formamide, urea, tetra-methylurea, ε-caprolactam, ethylene glycol, propylene glycol, diethylene glycol, triethylene glycol, polyethylene glycol, α-methyl ω-hydroxy polyethylene glycol ether, dimethyl polyethylene glycol ether, dipropylene glycol, polypropylene glycol, dimethyl polypropylene glycol ether, copolymers of ethylene glycol and propylene glycol, butyl glycol, methylcellulose, glycerol, diglycerol, polyglycerol, N-methyl-pyrrolidone, 1,3-diethyl-2-imidazolidinone, thiodiglycol, sodium benzenesulfonate, sodium xylenesulfonate, sodium toluenesulfonate, sodium cumenesulfonate, sodium dodecylsulfonate, sodium benzoate, sodium salicylate, sodium butyl monoglycol sulfate, cellulose derivatives, gelatin derivatives, polyvinylpyrrolidone, polyvinyl alcohol, polyvinylimidazole and co- and terpolymers of vinylpyrrolidone, vinyl acetate and vinylimidazole. Polymers comprising vinyl acetate building blocks may subsequently be saponified to the vinyl alcohol.

Component (F) comprises for example thickeners, preservatives, viscosity stabilizers, grinding assistants and fillers. Further customary additives are antisettling agents, photoprotectants, antioxidants, degassers/defilmers, foam-reducing agents, anticaking agents and also viscosity and rheology improvers. Useful viscosity regulators include for example polyvinyl alcohol and cellulose derivatives. Water-soluble natural or manufactured resins and also polymers may similarly be included as filming or binding agents to enhance bonding strength and abrasion resistance. Useful pH regulators include organic or inorganic bases and acids. Preferred organic bases are amines, for example ethanolamine, diethanolamine, triethanolamine, N,N-dimethylethanolamine, diisopropylamine, aminomethylpropanol or dimethylaminomethylpropanol. Preferred inorganic bases are sodium hydroxide, potassium hydroxide, lithium hydroxide or ammonia. Component (F) further comprises fats and oils of vegetable and animal origin, for example beef tallow, palm kernel fat, coconut fat, rapeseed oil, sunflower oil, linseed oil, palm oil, soy oil, groundnut oil and whale oil, cotton seed oil, maize oil, poppy seed oil, olive oil, castor oil, colza oil, safflower oil, soybean oil, thistle oil, sunflower oil, herring oil, sardine oil. Common additives also include saturated and unsaturated higher fatty acids, for example palmitic acid, cyprylic acid, capric acid, myristic acid, lauric acid, stearic acid, oleic acid, linoleic acid, linolenic acid, caproic acid, caprylic acid, arachidic acid, behenic acid, palmitoleic acid, gadoleic acid, erucic acid and ricinoleic acid, and also salts thereof.

Water used as component (G) to produce the pigment preparations is preferably used in the form of demineralized or distilled water. It is similarly possible to use drinking water (tap water) and/or water of natural origin.

The present invention also provides a process for producing the pigment preparations of the present invention, which process comprises dispersing said component (A) in the form of powder, granulate or aqueous presscake in the presence of water (G) and also said components (B) and optionally (C) and (D), then optionally admixing water (G) and also optionally one or more of said components (E) and (F) and optionally diluting the resulting aqueous pigment dispersion with water (G). Said components (B) and optionally one or more of said components (C), (D), (E) and (F) are preferably initially mixed and homogenized, then said component (A) is stirred into the initially charged mixture, said component (A) being incipiently pasted and predispersed. The predispersion is subsequently, depending on the texture of component (A), finely dispersed or finely dissipated, with or without cooling, using a grinding or dispersing assembly. Such may include stirrers, dissolvers (sawtooth stirrers), rotor-stator mills, ball mills, stirred media mills such as sand and bead mills, high speed mixers, kneaders, roll stands or high performance bead mills. The fine dispersing or grinding of component (A) is carried on to the desired particle size distribution and can take place at temperatures in the range from 0 to 100° C., advantageously at a temperature between 10 and 70° C., preferably at 20 to 60° C. Following the fine-dispersing operation, the pigment preparation may be further diluted with water (G), preferably deionized or distilled water.

The pigment preparations of the present invention are useful for pigmentation and coloration of natural and synthetic materials of any kind, particularly of aqueous paints, emulsion and varnish colors, water-thinnable varnishes, wallpaper colors and printing colors, for coloration of paper and paper pulp, for paper pulp coloration, for coloration of paper surfaces and paper-coating compositions, for papermaking and for coloration of cardboard and textiles.

The pigment preparations of the present invention are further useful for coloration of macromolecular materials of any kind, for example of natural and synthetic fiber materials, preferably cellulose fibers. Further uses are the production of printing colors, for example textile printing colors, flexographic printing inks, decorative printing inks or intaglio printing inks, wallpaper colors, water-thinnable coatings, wood preservation systems, viscose dope dyeing systems, varnishes, including powder coatings, sausage casings, seed, fertilizers, glass, particularly glass bottles, and also of mass coloration of roof shingles, for coloration of renders, concrete, wood stains, colored pencil leads, felt tip pens, waxes, paraffins, graphics inks, ball point pen pastes, chalks, washing and cleaning compositions, shoe care agents, latex products, abrasives, and also for coloration of plastics or high molecular weight materials of any kind. Examples of high molecular weight organic materials are cellulose ethers and esters, such as ethylcellulose, nitrocellulose, cellulose acetate or cellulose butyrate, natural resins or synthetic resins, such as addition polymerization resins or condensation resins, for example amino resins, particularly urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, latices, silicone, silicone resins, individually or in admixture.

The pigment preparations of the present invention are further useful for producing liquid printing inks for use in all conventional ink-jet printers, particularly for those based on the bubble jet or piezo process. These liquid printing inks can be used to print paper and also natural or synthetic fiber materials, foils and plastics. Additionally, the pigment preparations of the present invention can be used for printing various kinds of coated or uncoated substrate materials, for example for printing paper board, cardboard, wood and woodbase materials, metallic materials, semiconductor materials, ceramic materials, glasses, glass and ceramic fibers, inorganic materials of construction, concrete, leather, comestibles, cosmetics, skin and hair. The substrate material may be two-dimensionally planar or spatially extended, i.e., three-dimensionally configured, and may be printed or coated completely or only in parts.

The pigment preparations of the present invention are also useful as a colorant in electrophotographic toners and developers, for example in one- or two-component powder toners (also called one- or two-component developers), magnet toners, liquid toners, latex toners, polymerization toners and also specialty toners. Typical toner binders in this context are addition polymerization resins, polyaddition resins and polycondensation resins, such as styrene, styrene-acrylate, styrene-butadiene, acrylate, polyester, phenol-epoxy resins, polysulfones, polyurethanes, individually or in combination, and also polyethylene and polypropylene, which may each contain further ingredients, such as charge control agents, waxes or flow assistants, or are subsequently modified with these adjuvants.

The pigment preparations of the present invention are also useful as a colorant in liquid inks, preferably ink-jet inks, for example aqueous or nonaqueous (solvent based), microemulsion inks, UV-curable inks, and also in such inks that operate according to the hot melt process.

The pigment preparations of the present invention can also be used as colorants for color filters for flat panels displays, not only for additive but also for subtractive color production, also for photoresists and also as colorants for "electronic inks" or "e-inks" or "electronic paper" or "e-paper".

EXAMPLES

Preparation of Dispersants (B)

Synthesis Example 1

A flask equipped with stirrer, reflux condenser, internal thermometer and nitrogen inlet was initially charged with 258 g of polyalkylene glycol monomethacrylate (molar mass 750, molar EO/PO ratio 6.3), 136.4 g of 2-ethylhexyl methacrylate, 71.6 g of styrene and 16.5 g of 1-dodecanethiol in 660 ml of tertiary butanol under nitrogen. Then, the initial charge was heated to 80° C. with stirring. On attainment of the reaction temperature 16.5 g of AMBN initiator, dissolved in 130 ml isobutanol, were added during 1 hour. This was followed by a further 5 hours of stirring at that temperature. After cooling to room temperature, the solvent was removed in vacuo. The polymer thus obtained was initially charged to a flask under nitrogen together with 32.7 g of sulfamic acid and 1.0 g of urea. The initial charge was then heated to 100° C. for 4 hours with stirring. Then the pH was adjusted to 6.5-7.5 with 50% aqueous sodium hydroxide solution. NMR spectroscopy verified a degree of conversion of >95% to the corresponding sulfuric ester ammonium salt.

The following synthesis examples 2 to 4 were carried out similarly to synthesis example 1 using the following starting materials:

Synthesis Example 2

210 g of polyalkylene glycol monomethacrylate (molar mass 350, molar EO/PO ratio 1.7), 79.2 g of 2-ethylhexyl methacrylate, 41.6 g of styrene, 57.1 g of sulfamic acid, 1.8 g of urea.

Synthesis Example 3

258 g of polyalkylene glycol monomethacrylate (molar mass 750, molar EO/PO ratio 6.3), 87.5 g of lauryl methacrylate, 35.8 g of styrene, 32.7 g of sulfamic acid, 1.0 g of urea.

Synthesis Example 4

210 g of polyalkylene glycol monomethacrylate (molar mass 350, molar EO/PO ratio 1.7), 101.6 g of lauryl methacrylate, 41.6 g of styrene, 57.1 g of sulfamic acid, 1.0 g of urea.

Synthesis Example 5

A flask equipped with stirrer, reflux condenser, internal thermometer and nitrogen inlet was initially charged with 363 g of polyalkylene glycol monomethacrylate (molar mass 1100, molar EO/PO ratio 10.2, 70% in t-butanol), 117.3 g of lauryl methacrylate, 48.0 g of styrene and 11.1 g of 1-dodecanethiol in 730 ml of tertiary butanol under nitrogen. Then, the initial charge was heated to 80° C. with stirring. On attainment of the reaction temperature 11.1 g of AMBN initiator, dissolved in 150 ml of isobutanol, were added during 1 hour. This was followed by a further 5 hours of stirring at that temperature. After cooling to room temperature, the solvent was removed in vacuo. The copolymer thus obtained was initially charged to a flask under nitrogen. Then 22.7 g of maleic anhydride and 0.7 g of sodium hydroxide were added followed by heating to a temperature of 75 to 85° C. with stirring. Stirring was continued at that temperature for three hours and then 292 g of aqueous sodium sulfite solution (10%) were metered in. Stirring was continued at 60 to 70° C. until the reaction had ended, and finally the pH was adjusted to pH 7 with 50% aqueous sodium hydroxide solution.

The following synthesis examples 6 to 23 were carried out similarly to synthesis example 5 using the following starting materials:

Synthesis Example 6

452 g of polyalkylene glycol monomethacrylate (molar mass 2000, molar EO/PO ratio 20.5, 70% in t-butanol), 80.4 g of lauryl methacrylate, 32.9 g of styrene, 15.5 g of maleic anhydride, 0.5 g of sodium hydroxide, 199 g of aqueous sodium sulfite solution (10%).

Synthesis Example 7

210 g of polyalkylene glycol monomethacrylate (molar mass 350, molar EO/PO ratio 1.7), 202.8 g of stearyl methacrylate, 62.4 g of styrene, 58.8 g of maleic anhydride, 1.9 g of sodium hydroxide, 756 g of aqueous sodium sulfite solution (10%).

Synthesis Example 8

258 g of polyalkylene glycol monomethacrylate (molar mass 750, molar EO/PO ratio 6.3), 38.2 g of isobornyl methacrylate, 30.3 g of benzyl methacrylate, 33.7 g of maleic anhydride, 1.1 g of sodium hydroxide, 433 g of aqueous sodium sulfite solution (10%).

Synthesis Example 9

363 g of polyalkylene glycol monomethacrylate (molar mass 1100, molar EO/PO ratio 10.2, 70% in t-butanol), 39.3 g of tetrahydrofurfuryl methacrylate, 87.8 g of phenethyl methacrylate, 22.7 g of maleic anhydride, 0.7 g of sodium hydroxide, 292 g of aqueous sodium sulfite solution (10%).

Synthesis Example 10

452 g of polyalkylene glycol monomethacrylate (molar mass 2000, molar EO/PO ratio 20.5, 70% in t-butanol), 25.0 g of ethoxyethyl methacrylate, 29.7 g of 1-vinylimidazole, 15.5 g of maleic anhydride, 0.5 g of sodium hydroxide, 199 g of aqueous sodium sulfite solution (10%).

Synthesis Example 11

210 g of polyalkylene glycol monomethacrylate (molar mass 350, molar EO/PO ratio 1.7), 69.0 g of lauryl acrylate, 52.8 g of benzyl methacrylate, 58.8 g of maleic anhydride, 1.9 g of sodium hydroxide, 755 g of aqueous sodium sulfite solution (10%).

Synthesis Example 12

258 g of polyalkylene glycol monomethacrylate (molar mass 750, molar EO/PO ratio 6.3), 38.2 g of 1-vinyl-2-pyrrolidone, 107.3 g of styrene, 33.7 g of maleic anhydride, 1.1 g of sodium hydroxide, 433 g of aqueous sodium sulfite solution (10%).

Synthesis Example 13

452 g of polyalkylene glycol monomethacrylate (molar mass 2000, molar EO/PO ratio 20.5, 70% in t-butanol), 31.3 g of 2-ethylhexyl methacrylate, 27.8 g of benzyl methacrylate, 15.5 g of maleic anhydride, 0.5 g of sodium hydroxide, 199 g of aqueous sodium sulfite solution (10%).

Synthesis Example 14

363 g of polyalkylene glycol monomethacrylate (molar mass 1100, molar EO/PO ratio 10.2, 70% in t-butanol), 58.7 g of lauryl methacrylate, 43.9 g of phenethyl methacrylate, 22.7 g of maleic anhydride, 0.7 g of sodium hydroxide, 292 g of aqueous sodium sulfite solution (10%).

Synthesis Example 15

258 g of polyalkylene glycol monomethacrylate (molar mass 750, molar EO/PO ratio 6.3), 116.3 g of stearyl methacrylate, 70.9 g of 2-phenoxyethyl methacrylate, 33.7 g of maleic anhydride, 1.1 g of sodium hydroxide, 433 g of aqueous sodium sulfite solution (10%).

Synthesis Example 16

210 g of polyalkylene glycol monomethacrylate (molar mass 350, molar EO/PO ratio 0.43), 72.0 g of lauryl acrylate, 52.8 g of benzyl methacrylate, 58.8 g of maleic anhydride, 1.9 g of sodium hydroxide, 755 g of aqueous sodium sulfite solution (10%).

Synthesis Example 17

258 g of polyalkylene glycol monomethacrylate (molar mass 750, molar EO/PO ratio 0.22), 87.5 g of lauryl methacrylate, 35.8 g of styrene, 33.7 g of maleic anhydride, 1.1 g of sodium hydroxide, 433 g of aqueous sodium sulfite solution (10%).

Synthesis Example 18

363 g of polyalkylene glycol monomethacrylate (molar mass 1100, molar EO/PO ratio 0.30, 70% in t-butanol), 58.7 g of lauryl methacrylate, 43.9 g of phenethyl methacrylate, 22.7 g of maleic anhydride, 0.7 g of sodium hydroxide, 292 g of aqueous sodium sulfite solution (10%).

Synthesis Example 19

388 g of polyalkylene glycol monomethacrylate (molar mass 750, molar EO/PO ratio 6.3), 68.2 g of 2-ethylhexyl methacrylate, 35.8 g of styrene, 50.7 g of maleic anhydride, 1.7 g of sodium hydroxide, 652 g of aqueous sodium sulfite solution (10%).

Synthesis Example 20

517 g of polyalkylene glycol monomethacrylate (molar mass 750, molar EO/PO ratio 6.3), 68.2 g of 2-ethylhexyl methacrylate, 35.8 g of styrene, 67.6 g of maleic anhydride, 2.2 g of sodium hydroxide, 869 g of aqueous sodium sulfite solution (10%).

Synthesis Example 21

280 g of polyalkylene glycol monomethacrylate (molar mass 350, molar EO/PO ratio 1.7), 79.2 g of 2-ethylhexyl methacrylate, 41.6 g of styrene, 78.5 g of maleic anhydride, 2.6 g of sodium hydroxide, 1009 g of aqueous sodium sulfite solution (10%).

Synthesis Example 22

387 g of polyalkylene glycol monomethacrylate (molar mass 750, molar EO/PO ratio 6.3), 87.5 g of lauryl methacrylate, 35.8 g of styrene, 50.6 g of maleic anhydride, 1.7 g of sodium hydroxide, 650 g of aqueous sodium sulfite solution (10%).

Synthesis Example 23

267 g of polyalkylene glycol monomethacrylate (molar mass 350, molar EO/PO ratio 1.7), 101.6 g of lauryl methacrylate, 41.6 g of styrene, 74.8 g of maleic anhydride, 2.4 g of sodium hydroxide, 961 g of aqueous sodium sulfite solution (10%).

Production of a Pigment Preparation:

The pigment, in the form alternatively of powder, granulate or presscake, was pasted up in deionized water together with the dispersants and the other adjuvants and then homogenized and predispersed using a dissolver (for example from VMA-Getzmann GmbH, type AE3-M1) or some other suitable apparatus. Fine dispersion was subsequently effected using a bead mill (for example AE3-M1 from VMA-Getzmann) or else some other suitable dispersing assembly, with milling being carried out with siliquartzite beads or zirconium mixed oxide beads of size d=1 mm, accompanied by cooling, until the desired color strength and coloristics were obtained. Thereafter, the dispersion was adjusted with deionized water to the desired final pigment concentration, the grinding media separated off and the pigment preparation isolated.

The pigment preparations described in the examples which follow were produced by the method described above, the following constituents being used in the stated amounts so as to produce 100 parts of the respective pigment preparation. Parts are by weight in the examples below.

Evaluation of a Pigment Preparation

Color strength and hue were determined in accordance with DIN 55986. The rub-out test was carried out by applying the emulsion paint, after mixing with the pigment dispersion, to a paint card. Subsequently, the applied coating was rubbed with the finger on the lower part of the paint card. Incompatibility was present if the rubbed area is then more strongly or brightly colored than the adjacent area not aftertreated (the rub-out test is described in DE 2 638 946). Color strength and compatibilities with the medium to be colored was determined using an emulsion paint for exteriors (waterborne, 20% $TiO_2$).

The coloristics of a paper pulp coloration were also evaluated. To this end, a chemical pulp suspension was given a 10% coloration with the pigment preparation, used to produce a firm piece of paper by drying and pressing and thereafter used to determine color strength and hue.

Foamability was determined by an internal method to simulate high flow velocities of the dispersions. To this end, the dispersions, after dilution with water to 2%, were continuously squirted by means of a peristaltic pump into a glass cylinder at high flow velocity and the height of the resulting foam was evaluated.

Shear stability of the pigment preparations was determined using an internal method of measurement. To this end, the pigment particles in the dispersion were flocculated in a chemical pulp suspension by means of cationic epichlorohydrin resins. Shearing was applied using a commercially available kitchen blender (Braun MX 32) set to a high speed of rotation. The pulp was then converted into paper and the color strength of a sheared dispersion was compared with that of an unsheared dispersion.

Viscosity was determined using a cone-and-plate viscometer (Roto Visco 1) from Haake at 20° C. (titanium cone: Ø 60 mm, 1°), the relationship between viscosity and shear rate in a range between 0 and 200 s$^{-1}$ being investigated. Viscosities were measured at a shear rate of 60 s$^{-1}$.

To evaluate the storage stability of the dispersions, viscosity was measured directly after production of the preparation and also after four weeks' storage at 50° C.

The pigment preparations described in the examples which follow were produced by the method described above, the following constituents being used in the stated amounts such that 100 parts of the respective pigment preparation are formed. Parts are by weight in the examples below.

Example 1

| | | |
|---|---|---|
| 50 parts | of component (A), C.I. Pigment Blue 15 | |
| 6 parts | of component (B), dispersant as per synthesis example 21 | |
| 2 parts | of component (C), wetter | |
| 10 parts | of component (E), ethylene glycol | |
| 0.2 part | of component (F), preservative | |
| Balance | component (G), water | |

The pigment preparation has a high color strength in the white dispersions and is stable. The rub-out test shows no color strength differences compared with the rubbed area. In paper coloration, the preparation produces a high color strength of clear hue. The loss of color strength in the shearing test is 4%. In the foaming test, the preparation shows no tendency to foam. The preparation proves to be readily flowable and storage stable since it is still very readily flowable after 28 days' storage at 50° C. Viscosity in the as-produced state is 488 mPa·s.

Example 2

| | | |
|---|---|---|
| 45 parts | of component (A), C.I. Pigment Red 112 | |
| 8 parts | of component (B), dispersant as per synthesis example 23 | |
| 1 part | of component (C), wetter | |
| 10 parts | of component (E), glycerol | |
| 0.2 part | of component (F), preservative | |
| Balance | component (G), water | |

The pigment preparation has a high color strength in the white dispersions and is stable. The rub-out test shows no color strength differences compared with the rubbed area. In paper coloration, the preparation produces a high color strength of clear hue. The loss of color strength in the shearing test is 2%. In the foaming test, the preparation only shows very little tendency to foam, and in any case the foam bubbles collapse again quickly. The preparation proves to be readily flowable and storage stable since it is still very readily flowable after 28 days' storage at 50° C. Viscosity in the as-produced state is 604 mPa·s.

Example 3

| | | |
|---|---|---|
| 40 parts | of component (A), C.I. Pigment Violet 23 | |
| 12 parts | of component (B), dispersant as per synthesis example 17 | |
| 3 parts | of component (C), wetter | |
| 10 parts | of component (E), ethylene glycol | |
| 0.2 part | of component (F), preservative | |
| Balance | component (G), water | |

The pigment preparation has a high color strength in the white dispersions and is stable. The rub-out test shows only very minimal color strength differences compared with the rubbed area. In paper coloration, the preparation produces a high color strength of clear hue. The loss of color strength in the shearing test is 5%. In the foaming test, the preparation shows no tendency to foam. The preparation proves to be readily flowable and storage stable. Viscosity in the as-produced state is 196 mPa·s.

Example 4

| | | |
|---|---|---|
| 44 parts | of component (A), C.I. Pigment Red 170 | |
| 8 parts | of component (B), dispersant as per synthesis example 1 | |
| 1 part | of component (C), wetter | |
| 5 parts | of component (E), propylene glycol | |
| 0.2 part | of component (F), preservative | |
| Balance | component (G), water | |

The pigment preparation has a high color strength in the white dispersions and is stable. The rub-out test shows no color strength differences compared with the rubbed area. In paper coloration, the preparation produces a high color strength of clear hue. There is no loss of color strength in the shearing test. In the foaming test, the preparation shows no tendency to foam. The preparation proves to be readily flowable and storage stable. Viscosity in the as-produced state is 383 mPa·s.

Example 5

| | | |
|---|---|---|
| 45 parts | of component (A), C.I. Pigment Orange 13 | |
| 9 parts | of component (B), dispersant as per synthesis example 9 | |
| 1.5 parts | of component (C), wetter | |
| 10 parts | of component (E), ethylene glycol | |
| 0.2 part | of component (F), preservative | |
| Balance | component (G), water | |

The pigment preparation has a high color strength in the white dispersions and is stable. The rub-out test shows no color strength differences compared with the rubbed area. In paper coloration, the preparation produces a high color strength of clear hue. The loss of color strength in the shearing test is 5%. In the foaming test, the preparation shows no tendency to foam. The preparation proves to be readily flowable and storage stable. Viscosity in the as-produced state is 754 mPa·s.

Further examples relating to pigment preparations are given in the table which follows. In each case, a 40% pigment preparation is produced on the basis of Pigment Yellow 83 in accordance with the following recipe:

| | |
|---|---|
| 40.0 parts | of component (A), C.I. Pigment Yellow 83 |
| 10.0 parts | of component (B), dispersant conforming to formula (I) or (II), from the synthesis example reported in the table |
| 2.0 parts | of component (C), wetter |
| 10.0 parts | of component (E), propylene glycol |
| 0.2 part | of component (F), preservative |
| Balance | component (G), water |

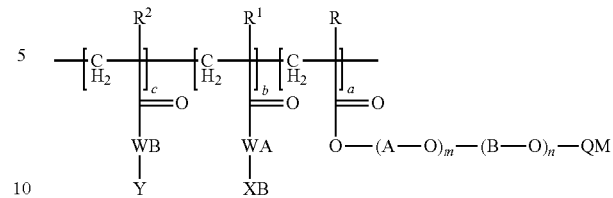

wherein
the indices a, b and c are the molar fraction of the respective monomers
a=0.01-0.8
b=0.001-0.8
c=0.001-0.8
provided the sum total of a+b+c is 1, and

| Synthesis example No. | Color strength in white dispersion % | Rub-out test | Color strength in paper % | Color strength loss in shearing test % | Foam formation in foaming test | Flowability of dispersion | Viscosity as produced mPa·s | Storage stability |
|---|---|---|---|---|---|---|---|---|
| 1 | 101 | no rub-out | 105 | 3 | no foam formation | very good | 295 | very good |
| 2 | 98 | minimal rub-out | 100 | 1 | no foam formation | good | 943 | good |
| 3 | 98 | no rub-out | 102 | 0 | very minimal foam formation | very good | 321 | very good |
| 4 | 105 | no rub-out | 101 | 4 | no foam formation | good | 620 | good |
| 5 | 101 | no rub-out | 99 | 3 | no foam formation | very good | 199 | very good |
| 6 | 95 | minimal rub-out | 102 | 0 | no foam formation | very good | 428 | very good |
| 7 | 100 | no rub-out | 104 | 1 | no foam formation | very good | 224 | very good |
| 8 | 108 | no rub-out | 106 | 4 | no foam formation | very good | 355 | adequate |
| 9 | 104 | no rub-out | 98 | 5 | mimimal foam formation | good | 768 | good |
| 10 | 98 | no rub-out | 102 | 2 | no foam formation | very good | 464 | very good |
| 11 | 110 | slight rub-out | 108 | 4 | no foam formation | very good | 472 | very good |
| 12 | 101 | no rub-out | 95 | 0 | no foam formation | good | 861 | good |
| 13 | 104 | no rub-out | 99 | 2 | no foam formation | very good | 169 | very good |
| 14 | 100 | no rub-out | 102 | 1 | no foam formation | very good | 678 | good |
| 15 | 106 | no rub-out | 103 | 5 | no foam formation | very good | 595 | very good |
| 16 | 101 | no rub-out | 105 | 3 | minimal foam formation | very good | 437 | good |
| 17 | 97 | minimal rub-out | 100 | 1 | no foam formation | very good | 512 | good |
| 18 | 103 | no rub-out | 101 | 0 | no foam formation | very good | 284 | very good |
| 19 | 99 | no rub-out | 103 | 1 | no foam formation | very good | 152 | very good |
| 20 | 107 | no rub-out | 105 | 3 | no foam formation | very good | 615 | good |
| 21 | 99 | no rub-out | 110 | 5 | no foam formation | very good | 541 | good |
| 22 | 101 | no rub-out | 102 | 3 | no foam formation | very good | 477 | very good |
| 23 | 102 | no rub-out | 101 | 2 | no foam formation | very good | 210 | very good |

What is claimed is:

1. An aqueous pigment preparation comprising (A) at least one organic, inorganic pigment, or a mixture thereof (B) a dispersant of formula (I) or (II) or mixtures of dispersants of formulae (I) and (II),

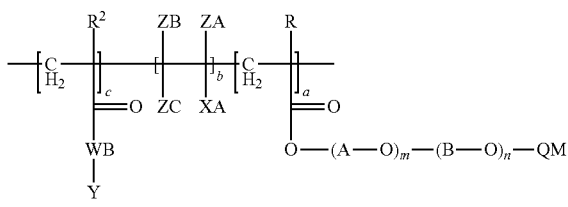

$(A-O)_m$ is propylene oxide units and $(B-O)_n$ is ethylene oxide units, or $(A-O)_m$ is ethylene oxide units and $(B-O)_n$ is propylene oxide units, and the molar fraction of ethylene oxide units is in the range from 50 to 98%, based on the sum total of ethylene oxide and propylene oxide units, the alkylene oxide units $(A-O)_m$ and $(B-O)_n$ are arranged in blocks, R is hydrogen or methyl, m is from 1 to 500;

n is from 1 to 500;

provided the sum total of m+n is from 2 to 1000;

XA is an aromatic or araliphatic radical having 3 to 30 carbon atoms, optionally containing one or more of the hetero atoms N, O and S, ZA is H or $(C_1-C_4)$-alkyl, ZB is H or $(C_1-C_4)$-alkyl, ZC is H or $(C_1-C_4)$-alkyl;

$R^1$ is hydrogen or methyl,

XB is an aromatic or araliphatic radical having 3 to 30 carbon atoms, optionally containing one or more of the hetero atoms N, O and S, WA is oxygen or an NH group, $R^2$ is hydrogen or methyl, Y is an aliphatic hydrocarbyl radical having 1 to 30 carbon atoms, which are linear, branched or cyclic, optionally containing hetero atoms O, N, S or a combination thereof and, optionally, may be unsaturated, WB is oxygen or an NH group;

Q is $SO_3$, $CH_2COO$;

or QM is:

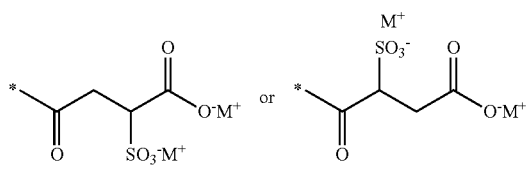

wherein

M is H, a monovalent metal cation, a divalent metal cation, $NH_4^+$, a secondary, tertiary or quaternary ammonium ion, or a combination thereof, or is the equivalent of di-, tri- or polyvalent metal ions;

(C) optionally wetters, (D) optionally further surfactants, dispersants or a combination thereof, (E) optionally one or more organic solvents, one or more hydrotropic substances or a combination thereof, (F) optionally further additive materials customary for preparing aqueous pigment dispersions, (G) water; and wherein the asterisk in the formula QM represents a free valency and indicates the linkage to the group $(B-O)_n$.

2. The pigment preparation as claimed in claim 1, comprising 5% to 80% by weight of said component (A).

3. The pigment preparation as claimed in claim 1, comprising 0.1% to 30% by weight of said component (B).

4. The pigment preparation as claimed in claim 1, wherein the following composition of said components (A) to (G) is:
(A) 5% to 80% by weight,
(B) 0.1% to 30% by weight,
(C) 0% to 10% by weight,
(D) 0% to 20% by weight,
(E) 0% to 30% by weight,
(F) 0% to 20% by weight,
(G) balance water,
all based on the total weight of said pigment preparation.

5. The pigment preparation as claimed in claim 1, wherein the following composition of said components (A) to (G) is:
(A) 10% to 70% by weight,
(B) 2% to 15% by weight,
(C) 0.1% to 5% by weight,
(D) 1% to 10% by weight,
(E) 5% to 20% by weight,
(F) 0.1% to 5% by weight,
(G) balance water,
all based on the total weight of said pigment preparation.

6. The pigment preparation as claimed in claim 1, wherein the organic pigment of said component (A) is a monoazo, disazo, laked azo, β-naphthol, Naphthol AS, benzimidazolone, disazo condensation, azo metal complex pigment phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments or carbon blacks.

7. The pigment preparation as claimed in claim 1, wherein, in said component (B), the QM as per formula (I) or (II) are sulfosuccinates.

8. A process for producing a pigment preparation as claimed in claim 1, comprising the steps of dispersing said component (A) in the form of powder, granulate or aqueous presscake in the presence of water (G) and also said components (B) and optionally (C) and (D), optionally admixing water (G) and optionally one or more of said components (E) and (F) and optionally diluting the resulting aqueous pigment dispersion with water (G);

or precharging said components (B) and optionally one or more of said components (C), (D), (E) and (F) being initially mixed and homogenized to form a precharged mixture, and stirring said component (A) into the precharged mixture, said component (A) being incipiently pasted and predispersed.

9. A pigmented natural or synthetic material pigmented by a pigment preparation as claimed in claim 1.

10. A composition pigmented by the pigment preparation as claimed in claim 1, wherein the composition is selected from the group consisting of aqueous paints, dispersion colors, varnish colors, water-thinnable varnishes, wallpaper colors and printing colors.

11. An article pigmented by a pigment preparation as claimed in claim 1, wherein the article is selected from the group consisting of natural and synthetic fiber materials, cellulose fibers, laminate, printing inks, ink-jet inks, electrophotographic toners, powder coatings, color filters, electronic inks, electronic paper color filters, wood preservation systems, viscose dope dyeing, sausage casings, seed, fertilizers, glass bottles, roof shingles, renders, concrete, wood stains, colored pencil leads, felt tip pens, waxes, paraffins, graphics inks, ballpoint pen pastes, chalks, washing compositions, cleaning compositions, shoe care agents, latex products, abrasives, and plastics.

12. A paper product or textile pigmented by a pigment preparation as claimed in claim 1, wherein the paper product is selected from the group consisting of paper, paper pulp, paper surfaces and paper coating compositions and cardboard.

* * * * *